United States Patent [19]

Forbes

[11] Patent Number: 4,667,461
[45] Date of Patent: May 26, 1987

[54] SKIMMER IMPROVEMENT FOR LAWN RAKE

[76] Inventor: Arthur C. Forbes, 333 Summit Ave., Jenkintown, Pa. 19046

[21] Appl. No.: 814,365

[22] Filed: Dec. 30, 1985

[51] Int. Cl.$^4$ ............................................. A01D 7/00
[52] U.S. Cl. ............................... 56/400.15; 56/400.17
[58] Field of Search ......... 56/400.04, 400.05, 400.07, 56/400.09, 400.13, 400.14, 400.15, 400.17, 400.08, 400.06

[56] References Cited

U.S. PATENT DOCUMENTS

| 464,802 | 12/1941 | Pinkham | 56/400.09 |
| 1,174,317 | 2/1916 | Heimerl | 56/400.15 |
| 1,318,079 | 10/1919 | Hong | 56/400.07 |
| 2,314,685 | 3/1943 | Brooke | 56/400.05 |
| 2,836,032 | 5/1958 | Melvin | 56/400.17 |
| 3,364,668 | 1/1968 | Scauetto | 56/400.17 |
| 4,057,953 | 11/1977 | Rugg | 56/400.17 |

Primary Examiner—Paul J. Hirsch
Attorney, Agent, or Firm—David J. Johns

[57] ABSTRACT

A skid device adapted to be removably attached to standard tined lawn rakes is provided. The device maintains the tines of the rake above the surface to be raked so to ease both the effort required to pull the rake and the damage caused to the substrate under the material to be raked, while allowing thorough raking action. The device is readily removable to allow standard raking action when desired.

9 Claims, 3 Drawing Figures

SKIMMER IMPROVEMENT FOR LAWN RAKE

BACKGROUND OF THE INVENTION

The field of the present invention is hand rakes, particularly skid or runner type ground support adapted to be attached to standard tined (or "lawn") rakes so to alleviate damage caused to the lawn and rake tines during the raking action while easing the raking effort.

A common problem in the raking of leaves and other materials using a lawn rake is that the tines of the rake grip more than just the material to be moved. This can severely damage both new and existing grass roots and scar a lawn. Additionally, the raking of leaves from a substrate of gravel or mulch using conventional lawn rakes often results in considerable relocation of the substrate -- thus drastically increasing the task of raking by requiring separation and spreading of the substrate once the raking is completed. Also, the tines of the rake itself are battered during the raking process which decreases the useful life of the rake. Moreover, the pulling required to move the tines of a lawn rake through a lawn is burdensome and tiring.

Through the years, various devices have been employed as runner attachments for cast iron toothed (or "garden") rakes. A search of skids or guards for all types of rakes produced the following:
U.S. Pat. No. 885,252 to Hughes
U.S. Pat. No. 1,174,317 to Heimerl
U.S. Pat. No. 1,536,742 to Anderson et al
U.S. Pat. No. 2,137,608 to Flavin
U.S. Pat. No. 2,790,297 to Gardner
These all involve using a variety of skids or wheels attached to the teeth, head, or handle of a garden rake to help prevent the teeth from ripping through the raking surface. Additionally, a lawn rake of unusual construction, U.S. Pat. No. 2,083,922 to Roessel, has been disclosed having modified tines which support the rake above the raking surface.

Although the foregoing devices may function reasonably well, each is deficient in a number of respects. Some of these devices are not readily and cleanly removable to permit standard raking action. Some of the devices add unnecessary weight, complexity, and cost to the rakes. Additionally, most of these devices support the rake at a fixed position above the raking surface and do not permit the user to exert pressure to achieve progressively increased amounts of raking action. Further, none of the devices provide an elongated skid surface for maximum glide across the lawn. Most importantly, none of the devices disclose a skid for attachment to the present standard form of spring steel, bamboo or plastic lawn rakes.

In light of the foregoing, it is an object of the present invention to provide a skid for a lawn rake which supports the tines of the rake above the raking surface so both to protect the rake tines and the lawn or other substrate by positioning the rake tines to grip only the material being moved and not the substrate, and to decrease vastly the effort required to pull the rake.

A further object of the present invention is to provide a skid device for a lawn rake which is lightweight, installs easily and securely, and is quickly retracted and stored to permit standard raking action.

An additional object of the present invention is to provide a skid device for a lawn rake which incorporates all the foregoing objects, is inexpensive to produce, and can be readily installed onto any standard lawn rake.

SUMMARY OF THE INVENTION

The present invention is directed to a skid device adapted to be attached to standard lawn rakes. The invention comprises: a flexible contoured skimmer element, which provides reinforcement for the tines of the lawn rake and two skid arms to support the rake tines above the substrate surface; and a mounting bracket and restraint arm, which both attach to the handle or upper tines of the rake and cooperate to retain removably the skimmer element on the rake.

Employing the present invention provides effective yet effortless raking action over a variety of substrate surfaces, including lawns, gravel, and mulch. The tines of the lawn rake are supported above the substrate so to avoid undesirable snagging of substrate which can damage the substrate, unduly complicate the raking procedure, and destroy the tines of the rake. However, the skimmer element is flexible and permits the user to exert added pressure to create standard raking action whenever it is desired. Additionally, the skimmer element is easily removed or swung out of use when extended standard raking action is necessary.

The present invention is designed to be inexpensively added to any standard lawn rake and can be readily installed by either a manufacturer or a consumer.

DESCRIPTION OF THE DRAWINGS

The operation and features of the present invention should become apparent from the following description when considered in conjunction with the accompanying drawings, in which.

DETAILED DESCRIPTION OF THE INVENTION

Figure 1:
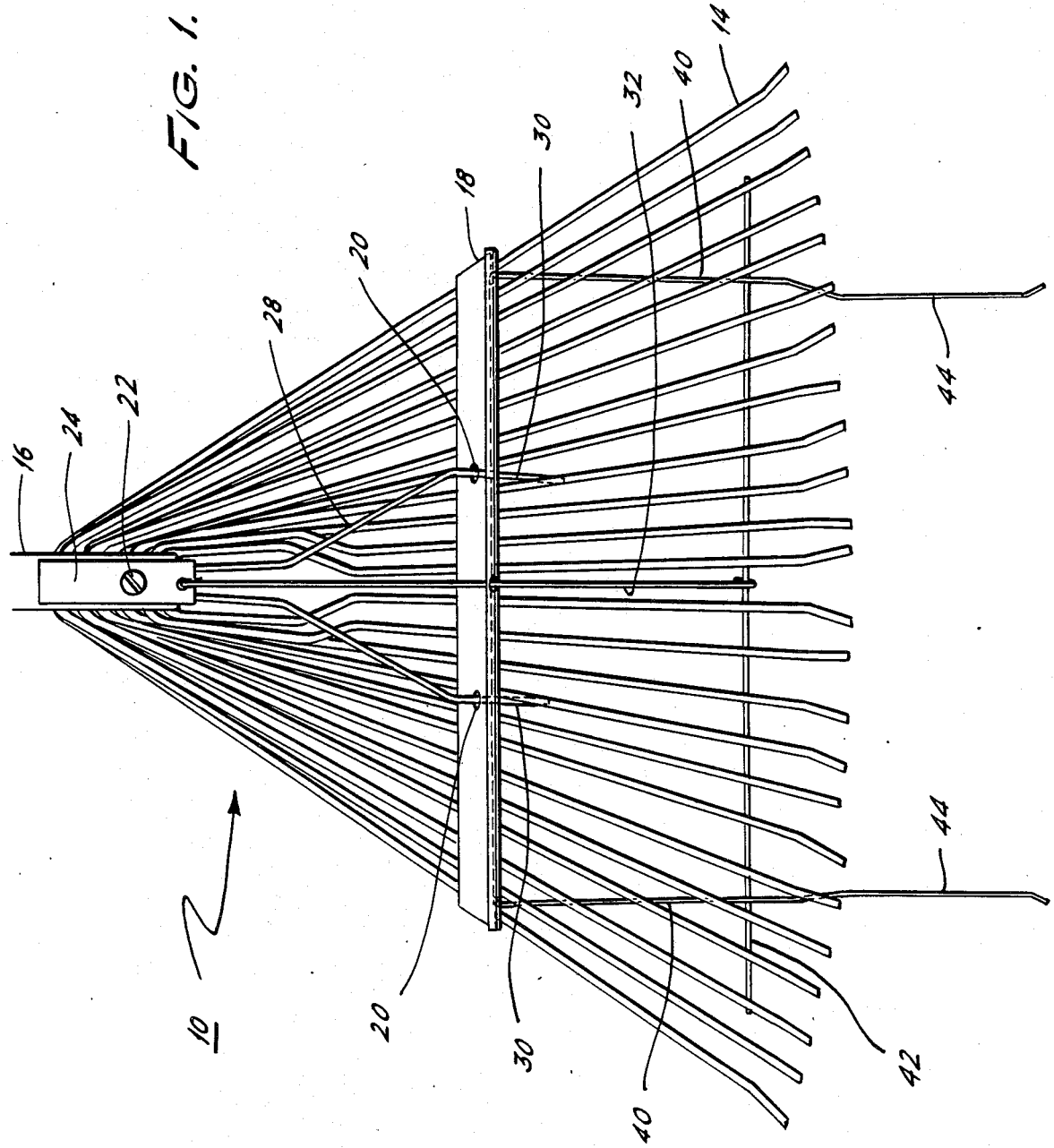
FIG. 1 is an overhead view of one embodiment of the present invention attached to a standard lawn rake.
Figure 2:
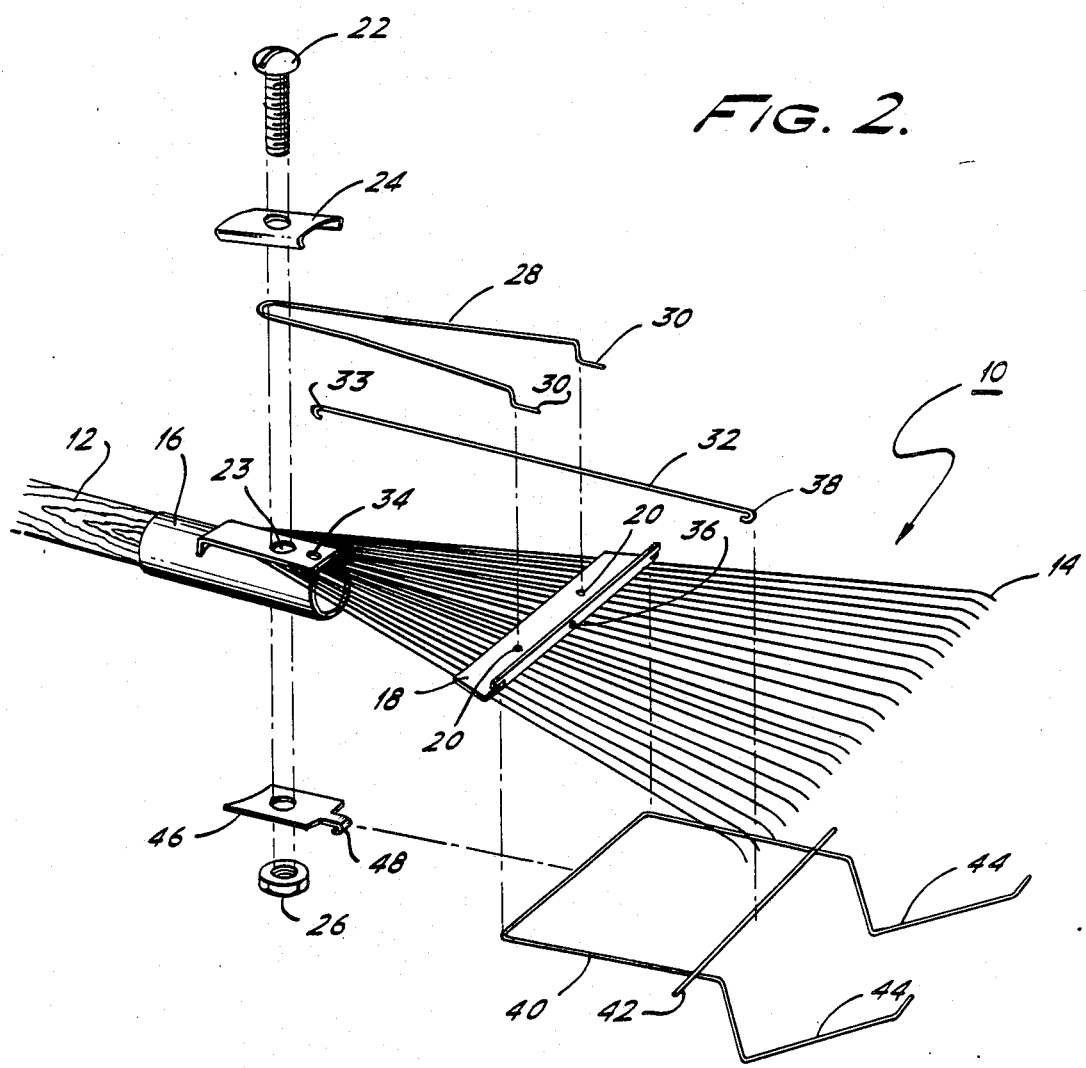
FIG. 2 is an exploded perspective view of one embodiment of the present invention in relationship to a standard lawn rake.

The present invention provides a skid device to be used on common lawn rakes. Illustrated in FIGS. 1 and 2 is a modified standard metal tined lawn rake 10 incorporating the present invention and having the standard features of a handle 12, a plurality of tines 14 which are attached to the handle 12 by a tine support bracket 16, and a tine reinforcement plate 18. As is true of many rakes of this kind, the tine reinforcement plate 18 contains two support arm receptacles 20. In normal operation, additional bracing is provided by a support arm (not shown) which attaches to each of the support arm receptacles 20, 20 and is held to the tine support bracket 16 through a combination of: a bolt 22, which passes through the tine support bracket 16 via orifice 23; an upper fitting 24, which seats on top of the support arm and holds it firmly against the tine support bracket 16; a lower fitting (not shown); and a nut 26.

To practice the present invention, the standard support arm is replaced by a mounting bracket 28 which, similar to the support arm it replaces, attaches to the tine support bracket through use of the bolt 22 and upper fitting 24. Also similar to the support arm, the mounting bracket 28 passes through the support arm receptacles 20, 20 in the tine reinforcement plate 18. Unlike the support arm, the mounting bracket 28 has two extended legs 30, 30 which legs 30, 30 pass through the receptacles 20, 20 and beyond the tine reinforcement plate 18.

A restraint arm 32 is added which engages via a downward bend 33 the tine support bracket 16 through a hole 34 added on the raking side of the orifice 23. The restraint arm 32 passes through an added opening 36 in the tine reinforcement plate 18 and ends in a downward facing hook 38 before reaching the ends of the tines 14. It should be noted that the restraint arm 32 may be adapted to pass over the tine reinforcement plate if desired, although some structural integrity may be lost by doing so. For reasons of flexibility and tine support, discussed below, the restraint arm 32 should be as long as possible, but it should be significantly shorter than the length of the tines so not to interfere with the use of the rake during normal raking action.

A contoured skimmer element 40 is provided, having a substantially rectangular upper section defined by a cross brace 42 and a pair of lower protruding skids 44, 44. The tips of the skids 44, 44 should bend upwards or should double back on themselves so to avoid snagging of the substrate.

The skimmer element 40 attaches to the rake by placing its rectangular side opposite the cross brace 42 under the two extended legs 30, 30 so to cause the skimmer element 40 to be held snuggly between the tines 14 and the extended legs 30, 30. The skimmer element 40 locks into this position by placing the cross brace 42 into the downward hook 38 of the restraint arm 32. Once installed, the skids 44, 44 should extend well beyond the ends of the tines 14 and should support the tines 14 of the rake approximately ⅛" above the substrate when the rake is held in the normal raking position.

The mounting bracket 28, the restraint arm 32, and the skimmer element 40 may be constructed from any desired material which provides sufficient support and flexibility, including plastic or metal. In light of their weather resistant smooth finish, ⅛" stainless steel or nickel plated steel are particularly desirable. The final configuration should provide sufficient flexibility in the skimmer element 40 and the restraint arm 32 both to permit the user to exert only relatively minor pressure to cause the tines 14 to contact the substrate, and to permit the user to bend the cross brace 42 to easily engage and disengage the hook 38.

Although the skimmer element may be readily removed to permit normal raking action, by providing a modified lower fitting 46 with a curved catch 48 (or merely a separate curved catch component 48 attached to the lower handle 12 or to an existing lower fitting), the skimmer element 40 may be disengaged easily from the restraint arm 32 and be swung back to engage the cross brace 42 onto the curved catch 48. This securely retains the skimmer element 40 with the rake but permits completely normal raking action. Equally effective storage of the skimmer element 40 may be accomplished by removing it entirely and then repositioning the cross brace 42 beneath the legs 30, 30 and attaching the opposite rectangular side of the skimmer element 40 to the curved catch 48.

The above embodiment of the present invention works well with little or no modification on many of the lawn rakes presently available on the market, including the Disston steel rake produced by Sandvik Group, Danville, Va. However, although this embodiment can be installed by consumers, the main modification work necessary may make it more amenable to addition by an original or after-market manufacturer. Moreover, there are certain lawn rakes, such as the common bamboo or plastic types, that do not use a support arm attached to a tine reinforcement plate. Accordingly, a modified mounting bracket and restraint arm has been provided which can be installed easily by consumers on any lawn rake.

Figure 3:
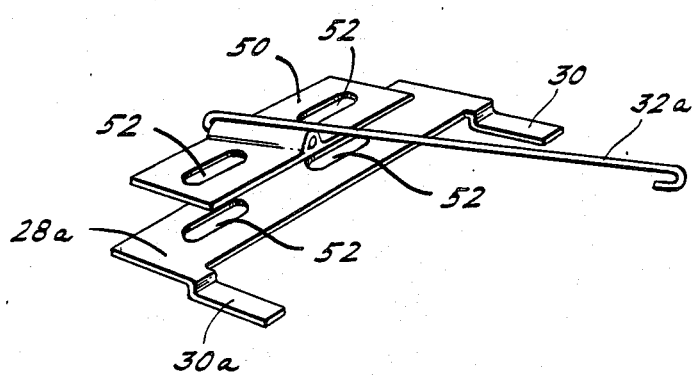
FIG. 3 is a perspective view of the mounting bracket and restraint arm of another embodiment of the present invention.

FIG. 3 illustrates a modified mounting bracket 28a having two modified legs 30a, 30a constructed from a piece of sheet metal. A modified restraint arm 32a is provided attached to a sheet metal attachment piece 50. The modified mounting bracket 28a and the attachment piece 50 each have two corresponding oblong openings 52. Attachment is accomplished by placing the modified mounting bracket 28a beneath the tines 14 and positioning the attachment piece 50 directly above it on top of the tines 14 and then anchoring the two together via nuts and bolts or other attachment means passing through each of the oblong openings 52, 52. By attaching the modified mounting bracket 28a so that its legs 30a, 30a are in approximately the same position as the legs 30, 30 in the embodiment disclosed above, the skimmer element 40 can be used unchanged on any lawn rake. The addition of a curved catch 48 allows the skimmer element 40 to be stored as discussed above.

While particular embodiments of the present invention have been disclosed herein, it is not intended to limit the invention to such a disclosure and changes and modifications may be incorporated and embodied within the scope of the following claims.

What is claimed is:

1. A runner apparatus for a lawn rake, said rake having a handle and a plurality of tines, to support the tines of the rake above a substrate to be cleared, comprising:
   a skimmer element having at least one skid to glide along the surface of the substrate;
   a mounting bracket which attaches to said rake and receives the skimmer element; and
   a restraint arm which cooperates with the mounting bracket to retain the skimmer element against said rake;
   wherein said skimmer element contains a cross brace, and said restraint arm contains a hook which engages said cross brace in order to retain said skimmer element against said rake.

2. Apparatus in accordance with claim 1 wherein said mounting bracket is provided with at least one leg and receives said skimmer element against said leg.

3. Apparatus in accordance with claim 1 wherein said tines are attached to the handle by a tine support bracket.

4. Apparatus in accordance with claim 3, wherein said mounting bracket is attached to said tine support bracket and a tine reinforcement plate, which plate spans a plurality of tines.

5. Apparatus in accordance with claim 3 wherein said restraint arm is attached to said tine support bracket.

6. Apparatus in accordance with claim 1 wherein said mounting bracket is anchored across a plurality of said tines.

7. Apparatus in accordance with claim 1 wherein said restraint arm is anchored across a plurality of said tines.

8. Apparatus in accordance with claim 1 wherein said handle is equipped with a curved catch member to receive said cross brace and retain said skimmer element in an inverted position away from the substrate surface.

9. Apparatus in accordance with claim 1 wherein said skimmer element may be removed from said mounting bracket and restraint arm.

* * * * *